United States Patent
Stein et al.

(10) Patent No.: US 8,799,987 B2
(45) Date of Patent: Aug. 5, 2014

(54) UPDATING SYSTEM BEHAVIOR DYNAMICALLY USING FEATURE EXPRESSIONS AND FEATURE LOOPS

(75) Inventors: Christopher Alexander Stein, San Francisco, CA (US); Karan Mangla, Mountain View, CA (US); Zhimin Chen, Menlo Park, CA (US); Erdong Chen, Fremont, CA (US)

(73) Assignee: Facebook, Inc., Menlo Park, CA (US)

(*) Notice: Subject to any disclaimer, the term of this patent is extended or adjusted under 35 U.S.C. 154(b) by 302 days.

(21) Appl. No.: 13/311,489

(22) Filed: Dec. 5, 2011

(65) Prior Publication Data

US 2013/0145418 A1 Jun. 6, 2013

(51) Int. Cl.
*H04L 29/06* (2006.01)

(52) U.S. Cl.
USPC .............................................................. 726/1

(58) Field of Classification Search
CPC .......... G06F 21/00; G06F 21/50; G06F 21/56
USPC .............................................................. 726/1
See application file for complete search history.

(56) References Cited

U.S. PATENT DOCUMENTS

2005/0256947 A1* 11/2005 Devarakonda et al. ....... 709/223
2007/0226796 A1* 9/2007 Gilbert et al. .................. 726/22

OTHER PUBLICATIONS

Blanzieri, E., et al., "A survey of learning-based techniques of email spam filtering," *Artif. Intell. Rev.* 29:63-92, 2008.
Carreras, X., et al., "Boosting Trees for Anti-Spam Email Filtering," in *Proceedings of RANLP-01, 4th International Conference on Recent Advances in Natural Language Processing*, Tzigov Chark, BG, 8 pages, 2001.
Dalvi, N., et al., "Adversarial Classification," in *Proceedings of the 10th ACM SIGKDD International Conference on Knowledge Discovery and Data Mining*, KDD '04, ACM, New York, NY, pp. 99-108, 2004.
Hao, S., et al., "Detecting Spammers with SNARE: Spatio-temporal Network-level Automatic Reputation Engine," USENIX Association, 18th USENIX Security Symposium, pp. 101-117, 2009.
Heymann, P., et al., "Fighting Spam on Social Web Sites—A Survey of Approaches and Future Challenges," *IEEE Internet Computing* 11(6):36-45, 2007.
Lowd, D., et al., "Adversarial Learning," in *Proceedings of the 11th ACM SIGKDD International Conference on Knowledge Discovery in Data Mining*, KDD '05, ACM, New York, NY, pp. 641-647, 2005.

(Continued)

*Primary Examiner* — Chau Le
(74) *Attorney, Agent, or Firm* — Fenwick & West LLP

(57) ABSTRACT

Behavior of an online system is modified dynamically using feature expressions and feature loops. A feature expression can be expressed as a combination of other features or feature expressions, thereby allowing specification of complex features. The sets of feature expressions and policies of an online system can be modified while the online system is running. Feature loops aggregate values of a feature expression across a plurality of actions, for example, number of occurrences of an event over a time interval. The online system evaluates a set of feature expressions in response to actions performed by users. Feature expressions are used to specify policies that determine how the online system reacts to certain types of user actions. The ability to dynamically modify the feature expressions and policies of the online system allows the online system to adapt to attacks by malicious users in a timely manner.

20 Claims, 4 Drawing Sheets

(56) References Cited

OTHER PUBLICATIONS

Ma, J., et al., "Identifying Suspicious URLs: An Application of Large-Scale Online Learning," in *Proceedings of the 26th International Conference on Machine Learning*, Montreal, Canada, pp. 681-688, 2009.

Thomas, K., et al., "The Koobface Botnet and the Rise of Social Malware," in *IEEE Proceedings of the 5th International Conference on Malicious and Unwanted Software*, Champaign, IL, pp. 63-70, 2010.

Von Ahn, L., et al., "CAPTCHA: Using Hard AI Problems for Security," *EUROCRYPT*, LNCS 2656, pp. 294-311, 2003.

Whittaker, C., et al., "Large-Scale Automatic Classification of Phishing Pages," in *NDSS*, 14 pages, 2010.

\* cited by examiner

UPDATING SYSTEM BEHAVIOR DYNAMICALLY USING FEATURE EXPRESSIONS AND FEATURE LOOPS

BACKGROUND

This invention relates to expressions based on features of users and user actions of an online system for performing dynamic updates to the behavior of the online system.

Online systems often get attacked by malicious users that cause harm to the online system or to the users of the online system. A malicious user can cause harm by gaining unauthorized access to user accounts, stealing information from the online system, sending unsolicited information to the users, and so on. For example, a malicious user may launch a phishing attack to gain access to a user's account. Once a user's account is compromised, the compromised account can be used to launch other attacks. Malicious users can send messages to users that cause malware to be installed on the user's device. Malware installed on a user's device can cause messages to be sent to other users that cause the malware to replicate itself.

There are other types of user actions that cause harm that may be less severe than the examples given above. Users may use the online system in ways that are discouraged by the online system. For example, an online system may recommend each user to have one user account. However, users may create multiple user accounts for various reasons, for example, to use each account for a particular purpose. These additional accounts created by a user may provide false information to the online system. For example, a social networking system may use the number of connections of a user as a metric to make certain decisions regarding the user, including the newsfeed sent to the user, direct advertisements to the user, and so on. Fake user accounts may increase the number of connections of the user thereby providing false information to the social networking system causing it to make incorrect decisions.

Online systems need to take actions to protect the online system itself and its users from these attacks. Online systems such as social networking systems store a social graph that describes how users are connected to each other. The social graph can be exploited by malicious users to rapidly propagate harm to the online system or the users of the online system. For example, users connected to each other via a social networking system trust each other and are more likely to respond to messages from a connection. Therefore, a user is more likely to interact with a malicious message received from a connection whose account has been compromised. A user's interaction with the malicious message can propagate the malicious message to other connections of the user. Any delay in responding to an attack on the social networking system can result in the harm being propagated rapidly to a very large number of users. Therefore, online systems, for example, social networking systems must respond to these attacks within a short period after the attack is launched in order to limit the damage caused by the attack. Furthermore, the attackers of a system may constantly change their strategies to avoid being identified. As a result, the online system must continuously adapt to changes of the attackers. Conventional techniques that respond to attacks after a significant delay can result in the harm being propagated to a large number of users.

SUMMARY

Embodiments of the invention allow the behavior of an online system to be dynamically modified using feature expressions and feature loops. The behavior of an online system is specified using policies that determine the response of the online system to user actions. A policy is specified in terms of a precondition and actions to be executed when the precondition is satisfied. A precondition is specified in terms of feature expressions. A feature expression can be specified as a value describing an entity represented in the online system, for example, a user or a user action. The feature expression can also be specified by composing other feature expressions using operators. The online system maintains a set of feature expressions and a set of policies. The online system evaluates a set of feature expressions in response to user actions. The feature expressions evaluated are used to determine whether any preconditions of policies are satisfied. If a precondition of a policy is satisfied, the actions corresponding to the policy are executed in response to the user action.

In an embodiment, the sets of feature expressions and policies can be modified while the online system is running without shutting down the system. The online system evaluates the modified set of feature expressions or policies for subsequent user actions. In an embodiment, the online system is a social networking system and evaluation of a feature expression may comprise identifying other users connected to a user and evaluating a sub-expression for each user. In an embodiment, the online system maintains feature loops that aggregate values of a feature expression across a plurality of actions. For example, a feature loop can aggregate the number of occurrences of a type of user action during a time interval.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

An online system is dynamically updated to change the behavior of the system that defines how the online system responds to user actions. For example, certain user actions are intended to cause harm to the online system or to the users of the online system. The online system analyzes information available in the online system to identify patterns that characterize these harmful user actions. Information available in the online system that characterizes user actions is represented as features. For example, a feature may indicate whether a message sent by a user to another includes uniform resource locators (URLs). A feature may be determined by observing a value available in the online system, for example, size of a message. The value may be generated by classifiers trained using machine learning techniques. A feature can also be determined by combining information obtained from multiple sources in the online system, for example, number of users connected via a social networking system with both the sender and recipient of a message.

Online system allows features to be specified using feature expressions that can combine simpler features using operators. Features can be nested using feature expressions to build complex features. New features can be dynamically added to the online system while the online system is running without shutting down the system. The online system also allows specifying feature loops that aggregate feature expressions over multiple user actions. For example, a feature loop may correspond to a number of times a particular pattern of features is observed during the past hour. The value of the feature loop is evaluated an updated periodically.

The online system implements policies determining how the online system reacts if user actions matching certain patterns are identified. Policies comprise preconditions that are specified using feature expressions or feature loops. Policies also comprise a set of actions to be performed if the precondition of the policy is satisfied. For example, a precondition of a policy may be satisfied if a user sends out more than a threshold number of messages in an hour. Furthermore, if the precondition of the policy is satisfied, the online system may perform certain actions specified by the policy, for example, sending a warning message to the user or temporarily disabling the user account.

Figure 1:
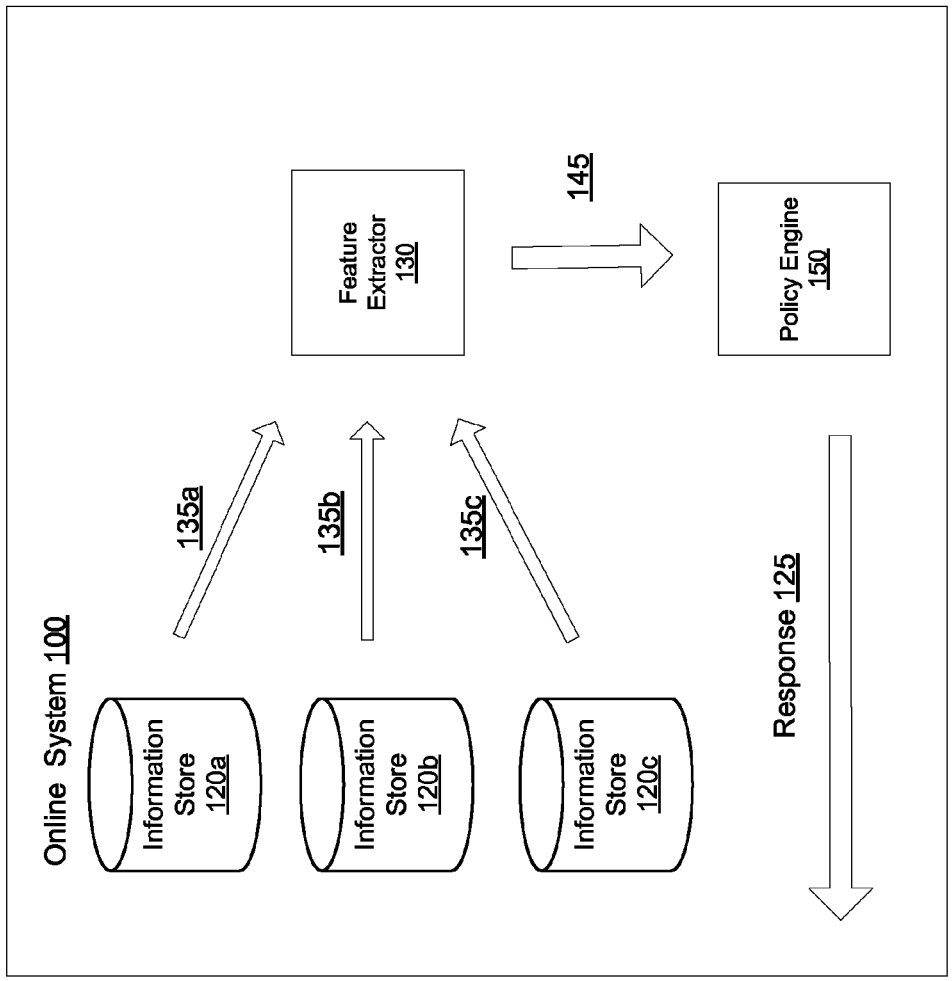
FIG. 1 is a diagram of the system environment illustrating an online system that is dynamically updated in response to attacks from malicious users, in accordance with an embodiment of the invention.
Figure 1:
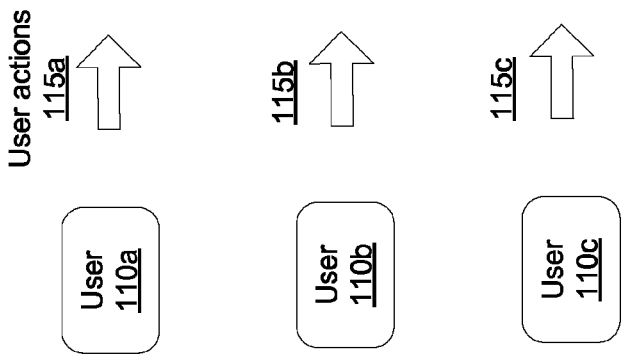

FIG. 1 is a diagram of the system environment illustrating an online system that responds to attacks, in accordance with an embodiment of the invention. The online system 100 can have multiple users 110 that perform actions 115 using the online systems. For example, if the online system 100 is a social networking system, the users 110 can interact with other users by sending messages, posting content including pictures, audio, or video content, commenting on content posted by other users and so on. FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

The online system 100 analyzes these actions to determine whether any actions are indicative of harmful activity by the user. If the online system 100 identifies actions indicative of harmful activity, the online system responds 125 to these actions to prevent the harm. For example, several users may create accounts with the online system 100. However, some user accounts created may be fake accounts corresponding to multiple accounts created by the same user. The online system 100 analyzes the accounts to determine whether an account created is a fake account. If the online system 100 identifies an account as a fake account, the online system 100 responds 125, for example, by disabling the account or by sending a message to user associated with the account to consolidate the user's multiple accounts. As another example, online system 100 analyzes messages sent by users to other users determine whether a user is sending spam messages. If a user is identified as sending spam, the online system can respond in one of various ways, for example, by sending a message to the user to stop sending spam, by deleting the messages sent by the user, by disabling the user's account, or by directing the spam messages to a spam folder.

The online system 100 analyzes information available in various information stores 120 of the online system 100 to determine the response 125 to a particular user action. Each action 115 performed by a users 110 can cause information associated with the action to be stored in one or more information stores. For example, the action 115 may be recorded in an event log, the action may cause analytic reports to be changed, or the action may trigger other actions in various modules of the online system 100. Furthermore, the online system 100 may analyze actions using information that may not be directly related to the particular actions 115. For example, the online system 100 may analyze past actions of the user, interactions of the user with other users, information describing the user stored in a user profile, social information describing the user, and the like.

The feature extractor 130 analyzes the information stored in various information stores 120 to identify various features describing the user and the actions. The features extracted 135 comprise information that is available in the information stores 120 as well as information derived from this information. The feature extractor 130 provides 145 the extracted features to the policy engine 150. The policy engine 150 identifies specific policies available to respond to an action or user identified as harmful. The policies are selected based on particular patterns identified in the features that are indicative of a harm caused by a user or the user's action. A policy specifies a response 125 to be taken in view of a harmful situation, for example, a particular harmful action.

System Architecture

Figure 2:
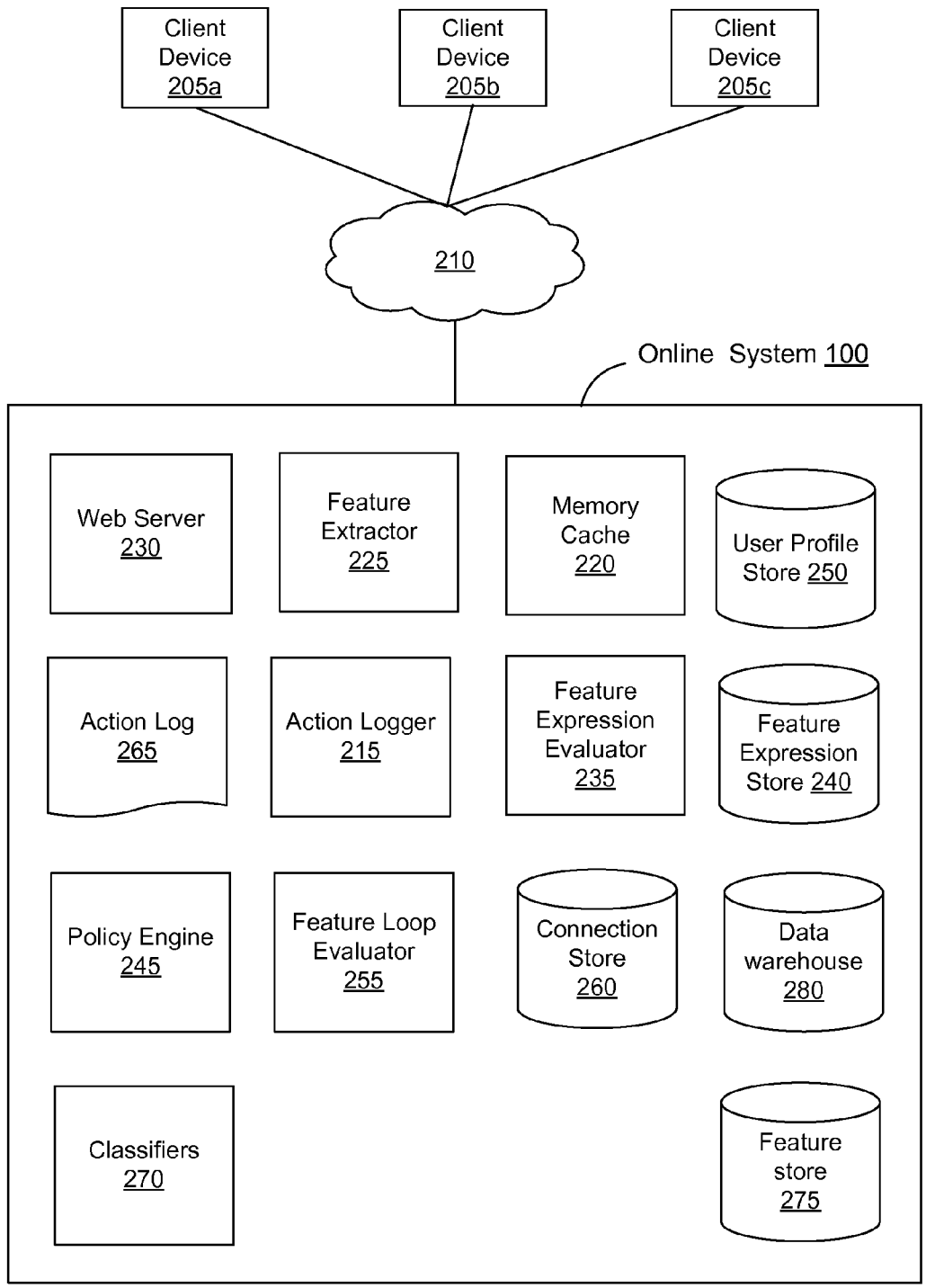
FIG. 2 is a high level block diagram illustrating the system architecture of an online system that can be updated using feature expressions and feature loops in order to dynamically modify the behavior of the online system, in accordance with an embodiment of the invention.

FIG. 2 is a high level block diagram illustrating a system environment suitable for associating cameras with users, in accordance with an embodiment of the invention. The system environment comprises one or more client devices 205, an online system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, video game system, etc. The client device 205 is configured to communicate via network 210. The client device 205 can execute an application, for example, a browser application that allows a user of the client device 205 to interact with the online system 100.

In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc. Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc.

The online system 100 includes a web server 230, a feature extractor 225, an action logger 215, a user profile store 250, a connection store 260, an action log 265, a feature expression evaluator 235, a feature loop evaluator 255, a feature expression store 240, a data warehouse 280, classifiers 270, and a policy engine 245. In other embodiments, the online system 100 may include additional, fewer, or different modules for various applications. Conventional components such as network interfaces, security mechanisms, load balancers, failover servers, management and network operations consoles, and the like are not shown so as to not obscure the details of the system.

The web server 230 links the online system 100 via the network 210 to one or more client devices 205; the web server 230 serves web pages, as well as other web-related content, such as Java, Flash, XML, and so forth. The web server 230 may provide the functionality of receiving and routing messages between the online system 100 and the client devices 205, for example, instant messages, queued messages (e.g., email), text and SMS (short message service) messages, or messages sent using any other suitable messaging technique.

The action logger 215 is capable of receiving communications from the web server 230 about user actions on and/or off the online system 100. The action logger 215 populates the action log 265 with information about user actions to track them. Such actions may include, for example, sending a message to other users, uploading an image, reading messages received from other users, viewing content associated with other users, among others.

The user account information and other related information for a user is stored in the user profile store 250. The user profile information stored in user profile store 250 describes the users of the online system 100, including biographic, demographic, and other types of descriptive information, such as work experience, educational history, gender, hobbies or preferences, location, and the like.

In some embodiments, the online system 100 is a social networking system that offers its users the ability to communicate and interact with other users of the social networking system. Users join the social networking system and then add connections to a number of other users of the social networking system to whom they desire to be connected. The connection store 260 stores data describing the connections between different users of the social networking system. The connections are defined by users, allowing users to specify their relationships with other users. For example, the connections allow users to generate relationships with other users that parallel the users' real-life relationships, such as friends, coworkers, partners, and so forth.

The feature extractor 225 extracts features by accessing information from various information stores 120 in the online system 100. Examples of information stores 120 include user profile store 250, connection store 260, data warehouse 280, action log 265 and the like. For example, the feature extractor 225 may continuously monitor the last part of the action log 265 (also called the tail of the action log 265) to determine various actions taking place in the online system 100. If the tail of the action log 265 is determined to match certain pattern, the feature extractor analyzes the action log 265 to identify one or more features. For example, the tail of the action log may indicate that a user sent a message to another user. The feature extractor may analyze the tail of the action log 265 to analyze the content of the message, for example, to determine whether any URLs were included in the message.

A feature may describe various entities represented in the online system 100, for example, users, messages, connections of a user, and so on. Examples of features of a message include, the number of URLs mentioned in a message or the communication channel used to send the message indicating whether the message was sent via an email, as an instant message, a wall post, a new feed or any other channel. Other features of the message include information describing the sender and the recipient, the number of connections between the sender and the recipient, an internet protocol (IP) address of a machine used to send the message, number of users to whom the message was sent, and so on. A feature of a user may comprise information described in the user's profile, for example, age of the user, gender of the user, income, ethnicity, number of connections of the user, and so on.

In an embodiment, feature values are determined using classifiers 270 that use machine learning techniques. Examples of machine learning techniques used include random forests, logistic regressions, boosting algorithms, and other supervised learning algorithms. The classifiers are trained using training data set obtained from past user actions, for example, historical data stored in action log 265. The features determined by classifiers may be stored in feature store 275 and then utilized by feature expression evaluator 235, feature loop evaluator 255, and other modules.

The data warehouse 280 stores reports describing information available in the online system 100 aggregated based on different criteria. For example a report may describe messages with a particular feature received over a given time interval. A report may describe all users that sent more than a threshold number of messages over a given time interval. The reports in the data warehouse 280 are periodically refreshed, thereby updating the information stored in the reports. For example, the reports in the data warehouse 280 may be refreshed daily at a predetermined time. In online systems 100 with large number of users and a large number of interactions between users, the amount of information processed to refresh a data warehouse 280 can be very large. Therefore, refreshing a data warehouse 280 can be a computation intensive operation that can take significant time to execute, for examples, several hours.

The feature expression store 240 stores feature expressions provided by a privileged user, for example, a system administrator. A feature expression may combine multiple sub-expressions using operators. A sub-expression can be a feature corresponding to a value obtained from an information store. A sub-expression can also be another feature expression. Examples of operators include mathematical operators including addition, subtraction, aggregation, logical operators including comparison, boolean operations, as well as user defined operators. For example, in a social networking system, an operator may take information identifying a user as input and determine the number of connections of the user. Alternatively an operator may take information identifying two users and input and return the number of users that are connected to both the users via the social networking system. A feature can be specified as a feature expression.

The feature expression evaluator 235 evaluates the values of various feature expressions and determines their values. In an embodiment, the feature expression evaluator 235 evaluates feature expression in response to an action performed by the users of the online system. For example, a set of feature expressions may be evaluated when a user sends a message to another user. The feature expression store 240 stores the associations between types of actions and feature expressions to be evaluated in response to a user action of a given type. The feature expression evaluator 235 may be automatically invoked periodically at a predetermined time interval or invoked in response to particular events that occur in the online system, for example, particular user actions. Accordingly, the feature expression evaluator 235 is continuously operating while the online system 100 is operational, i.e., the online system 100 is receiving and processing user requests.

In an embodiment, new expressions can be added to the online system 100, deleted from the online system 100, or modified while the online system 100 is running. In other words, the online system 100 does not have to be shut down in order to make modifications to the set of feature expressions in the online system 100. Typically the changes to feature expressions are performed by a privileged user of the online system 100, for example, a system administrator.

A new feature expression provided to the online system 100 may be validated by the feature expression evaluator 235 to make sure that there are no errors in the specification of the new feature expression, for example syntactic errors. The feature expression evaluator 235 may perform parsing and type checking of the new expression to validate the expression. After validation, the new feature expression is stored in the feature expression store 240 and evaluated for subsequent actions. A new feature expression may be specified in textual form using a user interface from a client device 205. A new feature expression may also be uploaded in the online system 100 as a script file.

A system administrator can also delete a feature expression from the feature expression store 240 or modify a feature expression available in the feature expression store 240. Once a change to the set of feature expressions of the feature expression store 240 is completed, the updated set is used while evaluating the features expressions for responding to subsequent user actions.

The policy engine 245 stores and evaluates policies determining how the online system 100 reacts to particular types of user actions. For example, a policy may determine that a message that results in a particular feature expression evaluating to true indicates that the message is a spam. Accordingly, the policy may indicate that the message should be marked as spam, and particular action be taken against the sender. The specification of a policy comprises a precondition specified as a feature expression. A policy may specify that if a feature expression evaluates to a particular value or to one of a set of predetermined values, the precondition is satisfied. A policy is determined to be applicable to an action if the precondition is satisfied for the policy when the action is performed. The policy also specifies one or more actions to be executed when the precondition of the policy is satisfied. Similar to feature expressions, policies can also be added to the online system 100, deleted from the online system 100, or modified in the online system 100 while the online system 100 is running without shutting down the system in order to upgrade the system.

The ability to dynamically make changes to feature expressions and policies of the online system 100 allows a system administrator to experiment with new policies in response to changes in external input. For example, certain malicious users may attack the online system 100 using various strategies. The behavior of the online system 100 is changed with respect to the malicious users by enforcing particular policies without shutting down the system. If a change to the policies is determined to be effective in responding to the attack, the change is retained or else the change can be backtracked. This is an ongoing process since the malicious users typically modify their strategies again to continue to attack the online system 100 and the online system 100 is subsequently updated to respond to the new attack.

The online system 100 also allows features to be specified as feature loops. A feature loop aggregates feature expression values across multiple actions. In an embodiment, the feature loops are stored in the feature expression store 240. The feature loop evaluator 255 evaluates the feature loops stored in the feature expression store 240 to determine their corresponding values. The feature loop evaluator 255 may maintain a counter in order to evaluate a feature loop. For example, a feature loop may correspond to a number of messages that were broadcast to more than a predetermined number of users within the past hours. The feature loop evaluator 255 may store a counter indicating this value and update the counter value periodically.

In some embodiments, the online system 100 may be a distributed system comprising multiple processors. For example, actions performed by different users may be processed by different processors. In an embodiment, the online system 100 includes a memory cache 220 to store values related to feature expressions and feature loops for fast access. For example, various counters related to feature loops may be stored in the memory cache 220. In an embodiment, a single processor maintains a value of a counter. Other processors that identify user actions that cause changes to the counter communicate with the processor storing the counter value in order to update the value. The memory cache 220 may implement various synchronization techniques to avoid race conditions between multiple processors attempting to update the counter values at the same time.

Figure 3:
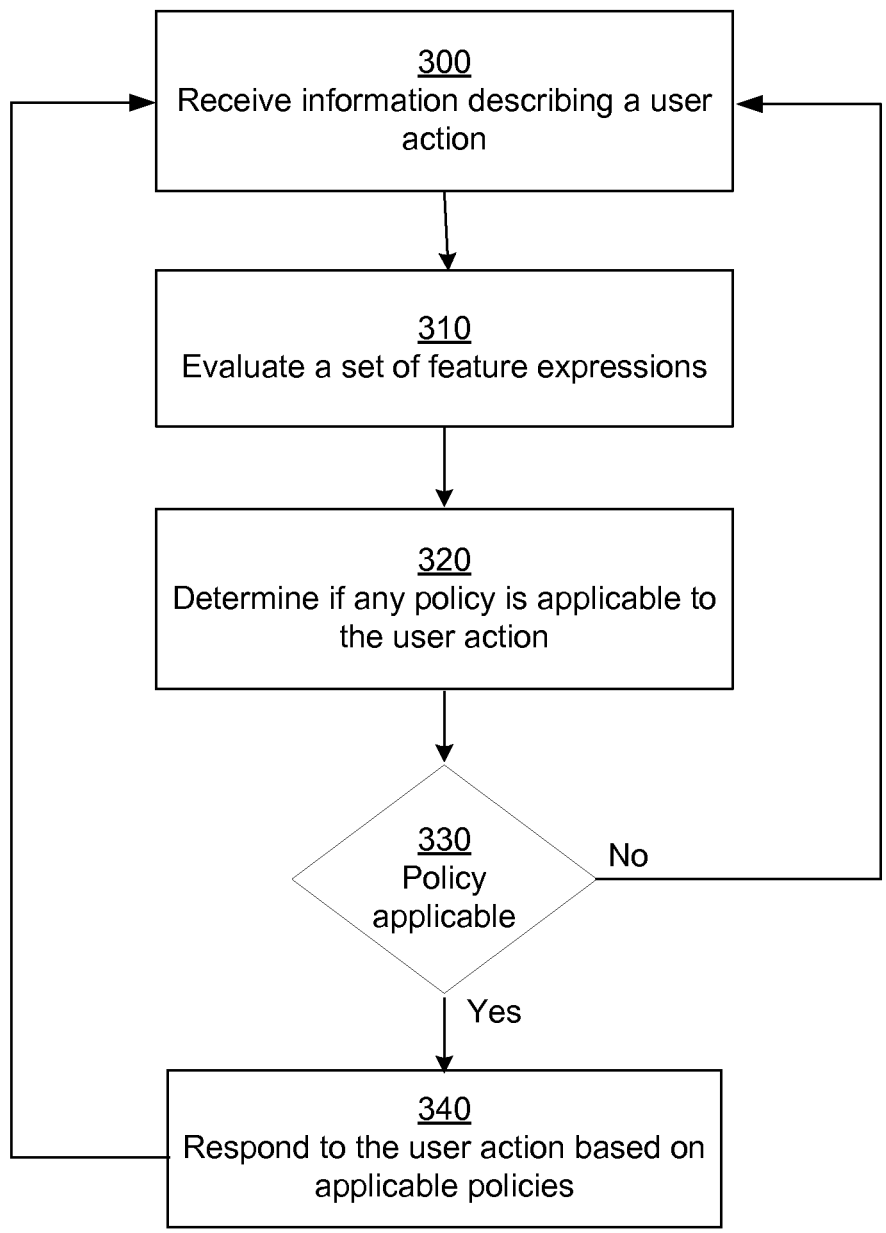
FIG. 3 is a flowchart of a process for evaluating policies in response to user actions to determine the response of the online system to a particular type of user action, in accordance with one embodiment of the invention.

FIG. 3 is a flowchart of a process for evaluating policies in response to user actions to determine whether the online system should respond to a particular type of user action, in accordance with one embodiment of the invention. The online system 100 receives 300 information describing an action performed by a user of the online system 100. For example, a user may send a message to one or more users of the online system or interact with other users of the online system using a channel provided by the online system 100. The feature expression evaluator 235 evaluates a set of feature expressions in response to the user action. The policy engine 245 determines whether any policy is applicable to the user action. The policy engine 245 evaluates preconditions of the policies specified as feature expressions. If a precondition of a policy is satisfied, the policy is determined 330 to be applicable to the user action. If a policy is determined 330 to be applicable to the user action, the online system 100 performs 340 actions specified by the applicable policies. The online system 100 continues receiving 300 information describing subsequent actions and processing them.

Figure 4:
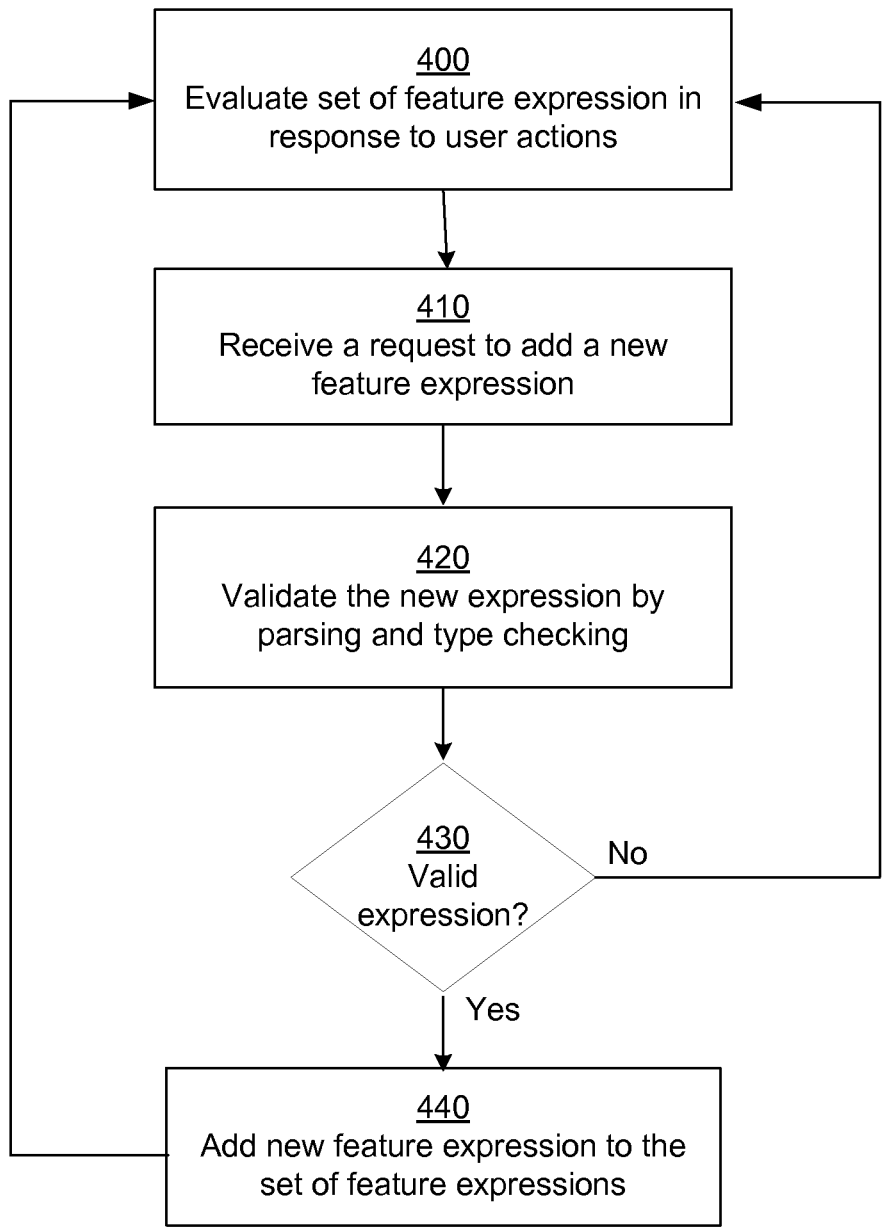
FIG. 4 is a flowchart of a process for dynamically modifying the behavior of an online system by modifying the set of feature expressions of the online system, in accordance with one embodiment of the invention.

The feature expressions and policies of the online system 100 can be dynamically updated. Updating feature expressions and policies includes adding, deleting, or modifying feature expressions or policies. FIG. 4 is a flowchart of a process for dynamically modifying the behavior of an online system by modifying the sets of feature expressions of the online system, in accordance with one embodiment of the invention. The online system 100 continuously evaluates 400 feature expressions in response to user actions. In an embodiment, the step 400 corresponds to the process illustrated in FIG. 3. While the online system responds to user actions, the set of feature expression can be modified, for example, by adding a new feature expression. The online system 100 accordingly receives 410 a request to add the new feature expression. The online system 100 validates 420 the new feature expression by parsing the specification of the feature expression and performing type checking. If the new feature expression is determined 430 to have invalid specification, the online system 100 reports the error and may discard the new feature expression. On the other hand, if the new feature expression is determined 430 to have valid specification, the online system 100 adds the new feature expression to the set of feature expressions.

In an embodiment, the steps 410, 420, 430, 440 are performed concurrently with the step 400. For example, the steps may be performed in parallel by different processors or executed concurrently by the same processor. As a result, the online system 100 is continuously operational while the feature expressions and policies of the online system 100 are updated. Once the update to the feature expressions or policies is complete, the online system 100 responds to the user actions by evaluating 400 the updated set of feature expressions or policies.

EXAMPLES OF FEATURE EXPRESSIONS

Feature expressions can be used to determine a variety of values used for implementing policies of the online system 100. The following feature expression (1) determines the maximum domain spam scores of all domains mentioned in a message.

(1) Max(Map(DomainSpamScore, ExtractDomains (Text))

The feature expression takes the text of the message as input, called "Text." The function "Max" determines the maximum of a set of values and the function "Map" applies the given function "DomainSpamScore" to a list of values. The list of values is returned by the function "ExtractDomains" that identifies all domains in the text of a message. Accordingly, the feature expression (1) determines the maximum value of the DomainSpamScore evaluated over all domains extracted from the text of a message.

The following feature (2) determines the number of pages that are liked by both sender and receiver of a message.

(2) Count(Intersect(LikedPages(Sender), LikedPages(Receiver)))

The function "LikedPages" returns a set of pages that a user liked. The function "Intersect" determines the intersection of two sets and the function "Count" returns the number of elements of a set. Accordingly, the feature expression (2) determines the sets of pages liked by the sender and receiver of a message and determines the number of elements in the intersection of the two sets.

The following feature (3) determines the number of users that are connected to both sender and receiver of a message.

(3) Count(Intersect(Connections(Sender), Connections (Receiver)))

The function "Connections" determines the set of users that are connected to a given user via a social networking system. The feature expression determines the sets of connections of the sender and receiver of a message and determines the count of the intersection of the two sets.

The following example shows a policy that determines whether a message sent using a channel of the online system 100 is a spam and takes appropriate action.

(4)

(4) And(IsChannel("messages"),
    And(GreaterThan(Count(ExtractURLs(Text)), 0),
        And(
            GreaterThan(ClassifyScore("fakers", "2011-03-15"), 0.41),
            GreaterThan(ClassifyScore("bad_urls", "2011-03-14"), -continued 0.74)
))) => SpamFolder The function "ClassifierScore" computes a particular score value for a message. The function "GreaterThan" determines if a first input is greater than a second input. The function "And" computes a boolean "and" of two logical input values. The function "ExtractURLs" extracts URLs from the text of a message. The function "IsChannel" determines whether a message belongs to a particular channel. Accordingly, the feature expression in the policy (4) determines whether the text of a message includes URLs. If the text of the message includes at least one URL, particular score values including "fakers" and "bad_urls" are determined for the message. If the score values are greater than respective thresholds and the message is sent using the channel "messages" the message is identified as a spam message. This feature expression is the precondition of the policy. If this precondition is satisfied for a message, the message is determined to be spam and an action "SpamFolder" is executed for the message. The action "SpamFolder" sends the message to the spam folder.

Feature Loops

Feature loops allow aggregation of information available in the online system 100, for example, across multiple user actions. The result of feature loops can also be used as features. The feature loops can also incorporate user feedback, data from crawlers (e.g., information about destination of a URL after the URL is crawled), and query data from data warehouse 280. The feature loops can be considered as equivalent of classifiers with a shared memory about past observations and classifications. The ability to aggregate information across large data sets and across different types of information sources allows specification of complex features. However, determination of these feature values requires longer execution time, i.e., higher latency.

In an embodiment, the feature loops are categorized based on the latency of feature computation. For example, feature loops are categorized as inner loops, middle loops, and outer loops as described herein. The inner loops comprise simple computation that requires very low latency, the middle loops comprise more complex computation that require longer latency compared to inner loops, and outer loops comprise computations that require even longer latency.

An inner loop comprises low-latency features that require simple computation, for example, incrementing or decrementing counters. An inner loop provides a mechanism to count values of one or more features. In an embodiment, a counter stores the number of occurrences of combination of values of some features over a predetermined period of time. For example, an inner loop may determine the number of times a URL is posted using a particular channel of communication between users of the online system 100. In an embodiment, the counter values are stored in memory cache 220. The feature loop evaluator 255 determines the value of the inner loop by reading the counter value from the memory cache 220, updating the counter value based on the current information available in the online system 100, and written back to the memory cache 220. Computations of inner loops may be computed in a few milliseconds, depending on the type of hardware configuration of the online system 100. The simplicity of inner loops allows a large number of inner loops to be maintained.

The middle loops provide a mechanism to apply more complex operations compared to inner loops. The latency of middle loop computations can be a few seconds. Middle loops can be used to determine more complex feature describing IPs and URLs related to communications between users of the online systems. For example, a middle loop may determine number of messages including a particular URL sent by an IP address in a given time interval. The counters implementing middle loops may also be stored in memory cache 220.

Outer loops require computations with more complex computations with longer latency that may require minutes or hours to compute. For example, an outer loop may determine the unique number of users who have posted a particular URL in a given day. To determine this feature, all posts of the given day are analyzed and the values corresponding to them aggregated. In some embodiments, determination of a value of a outer loop may require values computed in the data warehouse 280. Typically computation of the reports of the data warehouse can take several hours. Therefore, the reports of the data warehouse 280 may be refreshed one a day or once every few days. In some embodiments, the latency of outer loops is same as the periodic interval after which the data warehouse 280 is refreshed.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
maintaining, by a computer processor, in an online system:
a plurality of feature expressions, where at least one of the feature expressions comprises an expression composing one or more other feature expressions of the plurality of feature expressions using operators, the expression capable of being processed by a computer processor to map a set of input values to an output value, wherein the feature expression evaluates to a value describing one or more entities in the online system,
wherein the plurality of feature expressions can be modified by performing one or more of addition of a new feature expression, deletion of an existing feature expression, or update of an existing feature expression, wherein the modification to the plurality of feature expressions is performed while the online system is executing, and
a set of policies, each policy comprising a precondition represented as a feature expression and a policy action, wherein the policy action is executed if the precondition is satisfied;
receiving information describing one or more actions performed by users of the online system, each action associated with entities of the online system; and
responsive to receiving information describing each action:
evaluating each feature expression from the plurality of feature expressions,
determining whether a precondition of a policy from the set of policies is satisfied based on feature expression of the precondition, and
responsive to the precondition of the policy being satisfied, executing the corresponding policy action.

2. The computer-implemented method of claim 1, further comprising:
responsive to the plurality of feature expressions being modified, evaluating each feature expression of the modified plurality of feature expressions for subsequent user actions.

3. The computer-implemented method of claim 1, wherein the set of policies can be modified by performing one or more of addition of a new policy, deletion of an existing policy, or updating an existing policy, wherein the modification to the set of policies is performed while the online system is executing.

4. The computer-implemented method of claim 3, further comprising:
responsive to the set of policies being modified, evaluating each feature expression of the modified set of policies for subsequent user actions.

5. The computer-implemented method of claim 1, wherein the plurality of feature expressions comprises a first feature expression comprising a sub-expression and a second feature expression comprising the sub-expression, the method comprising:
determining a value of the sub-expression; and
determining the values of the first feature expression and the second feature expression using the value of the sub-expression.

6. The computer-implemented method of claim 1, wherein the online system is a social networking system, wherein an input to particular feature expression comprises information identifying a user and evaluating the particular feature expression comprises:
  identifying other users connected to the identified user; and
  evaluating a sub-expression of the particular feature expression for each of the other users connected to the identified user.

7. The computer-implemented method of claim 1, wherein the online system is a social networking system, wherein a particular feature expression comprises a sub-expression and an input to the particular feature expression comprises information identifying a first user and a second user, wherein evaluating the particular feature expression comprises:
  identifying other users connected to both the first user and the second user; and
  evaluating the sub-expression for each of the other users connected to both the first user and the second user.

8. The computer-implemented method of claim 1, wherein a user action comprises a message sent by a user to another user and a particular feature expression determines a value based on content of the message.

9. The computer-implemented method of claim 8, wherein a policy action corresponding to the user action comprises determining whether the message sent is spam.

10. The computer-implemented method of claim 1, wherein the online system further maintains feature loops, each feature loop aggregating values of a feature expression across a plurality of actions.

11. The computer-implemented method of claim 10, wherein a feature loop aggregates changes to values of a feature expression over a time interval.

12. The computer-implemented method of claim 10, wherein a feature loop aggregates the number of occurrences of a particular value obtained by evaluating a feature expression evaluating over a time interval.

13. The computer-implemented method of claim 10, wherein a feature loop aggregates the number of occurrences of an event during a previous time interval.

14. The computer-implemented method of claim 10, wherein a feature loop determines a number of users that performed an action of a particular type during a previous time interval.

15. The computer-implemented method of claim 10, wherein a feature loop is evaluated periodically at a fixed time interval.

16. The computer-implemented method of claim 10, wherein a result of a feature loop is stored in a distributed memory cache and evaluating the feature loop comprises periodically:
  retrieving a value of a counter from the distributed memory cache;
  re-evaluating a feature expression associated with the feature loop based on a previous time interval; and
  updating the counter based on a value of the feature expression based on the previous time interval.

17. A computer-implemented method comprising:
  maintaining, by a computer processor, in an online system,
    a plurality of feature expressions, wherein maintaining the plurality of feature expressions comprises evaluating the plurality of feature expressions for each user action, where at least one of the feature expressions comprises an expression composing one or more other feature expressions of the plurality of feature expressions using operators, the expression capable of being processed by a computer processor to map a set of input values to an output value, wherein the feature expression evaluates to a value describing one or more entities in the online system;
  receiving information describing a modification to the plurality of feature expressions, the modification comprising one or more of: addition of a new feature expression, deletion of an existing feature expression, or update of an existing feature expression, wherein the modification to the plurality of feature expressions is performed while the online system is executing;
  responsive to the plurality of feature expressions being modified, evaluating each feature expression of the modified plurality of feature expressions for a subsequent user action; and
  responding to the subsequent user action based on the values of the feature expressions from the modified plurality of feature expressions.

18. The computer-implemented method of claim 17, wherein the online system further maintains feature loops, each feature loop aggregating values of a feature expression across a plurality of actions and a response to each user action is determined based on the result of each feature loop evaluation.

19. The computer-implemented method of claim 18, wherein a feature loop is evaluated periodically at a fixed time interval.

20. A computer program product comprising a non-transitory computer-readable storage medium containing instructions for:
  maintaining, by a computer processor, in an online system:
    a plurality of feature expressions, where at least one of the feature expressions comprises an expression composing one or more other feature expressions of the plurality of feature expressions using operators, the expression capable of being processed by a computer processor to map a set of input values to an output value, wherein the feature expression evaluates to a value describing one or more entities in the online system,
    wherein the plurality of feature expressions can be modified by performing one or more of addition of a new feature expression, deletion of an existing feature expression, or update of an existing feature expression, wherein the modification to the plurality of feature expressions is performed while the online system is executing, and
    a set of policies, each policy comprising a precondition represented as a feature expression and a policy action, wherein the policy action is executed if the precondition is satisfied;
  receiving information describing one or more actions performed by users of the online system, each action associated with entities of the online system; and
  responsive to receiving information describing each action:
    evaluating each feature expression from the plurality of feature expressions,
    determining whether a precondition of a policy from the set of policies is satisfied based on feature expression of the precondition, and
    responsive to the precondition of the policy being satisfied, executing the corresponding policy action.

* * * * *